US010530720B2

(12) United States Patent
Vardhan et al.

(10) Patent No.: US 10,530,720 B2
(45) Date of Patent: Jan. 7, 2020

(54) CONTEXTUAL PRIVACY ENGINE FOR NOTIFICATIONS

(71) Applicant: McAfee, LLC, Santa Clara, CA (US)

(72) Inventors: Raj Vardhan, Bangalore (IN); Igor Tatourian, Santa Clara, CA (US); Dattatraya Kulkarni, Bangalore (IN); Jeremy Bennett, San Carlos, CA (US); Samrat Chitta, Bangalore (IN); Reji Gopalakrishnan, Bangalore (IN); Muralitharan Chithanathan, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 608 days.

(21) Appl. No.: 14/836,993

(22) Filed: Aug. 27, 2015

(65) Prior Publication Data

US 2017/0063750 A1 Mar. 2, 2017

(51) Int. Cl.

| | |
|---|---|
| ***H04L 12/58*** | (2006.01) |
| ***H04L 29/08*** | (2006.01) |
| ***G06F 3/0484*** | (2013.01) |
| ***G06Q 10/10*** | (2012.01) |
| ***H04M 1/725*** | (2006.01) |
| ***H04W 12/00*** | (2009.01) |
| ***H04L 29/06*** | (2006.01) |

(Continued)

(52) U.S. Cl.

CPC .......... *H04L 51/063* (2013.01); *G06F 3/0484* (2013.01); *G06Q 10/107* (2013.01); *H04L 51/24* (2013.01); *H04L 63/0428* (2013.01); *H04L 67/327* (2013.01); *H04M 1/72563* (2013.01); *H04W 12/005* (2019.01); *H04W 12/02* (2013.01); *H04M 1/6075* (2013.01)

(58) Field of Classification Search

CPC .............................. H04L 51/24; G06F 1/3231

See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |

(Continued)

FOREIGN PATENT DOCUMENTS

| | | | |
|---|---|---|---|
| WO | 2008102265 | A2 | 8/2008 |
| WO | 2017034746 | | 3/2019 |

OTHER PUBLICATIONS

International Search Report and Written Opinion in International Application No. PCT/US2016/044350 dated Oct. 28, 2016.

*Primary Examiner* — William G Trost, IV
*Assistant Examiner* — Imran Moorad
(74) *Attorney, Agent, or Firm* — Patent Capital Group

(57) ABSTRACT

In an example, there is disclosed a computing apparatus, including a user notification interface; a context interface; and one or more logic elements forming a contextual privacy engine operable to: receive a notification; receive a context via the context interface; apply the context to the notification via a notification rule; and take an action via the user notification interface based at least in part on the applying. The contextual privacy engine may also be operable to mathematically incorporate user feedback into the notification rule. There is also described a method of providing a contextual privacy engine, and one or more computer-readable storage mediums having stored thereon executable instructions for providing a contextual privacy engine.

25 Claims, 6 Drawing Sheets

(51) Int. Cl.
*H04W 12/02* (2009.01)
*H04M 1/60* (2006.01)

(56) References Cited

U.S. PATENT DOCUMENTS

| | | | | |
|---|---|---|---|---|
| 6,460,050 | B1 | 10/2002 | Pace et al. | |
| 7,073,129 | B1 | 7/2006 | Robarts et al. | |
| 7,506,155 | B1 | 3/2009 | Stewart et al. | |
| 2002/0083025 | A1 | 6/2002 | Robarts et al. | |
| 2009/0192970 | A1 | 7/2009 | Stern et al. | |
| 2011/0225368 | A1* | 9/2011 | Burge, III | G06F 12/0862 711/118 |
| 2012/0166433 | A1 | 6/2012 | Tseng | |
| 2012/0209871 | A1* | 8/2012 | Lai | G06F 17/30997 707/769 |
| 2013/0108115 | A1* | 5/2013 | Hwang | G06K 9/033 382/106 |
| 2014/0080454 | A1 | 3/2014 | Moody et al. | |
| 2015/0105106 | A1* | 4/2015 | Masterman | H04W 68/00 455/456.3 |
| 2015/0181555 | A1 | 6/2015 | Dey et al. | |
| 2016/0350812 | A1* | 12/2016 | Priness | G06Q 30/0269 |

* cited by examiner

CONTEXTUAL PRIVACY ENGINE FOR NOTIFICATIONS

FIELD OF THE SPECIFICATION

This disclosure relates in general to the field of computer privacy, and more particularly, though not exclusively to, a system and method for providing a contextual privacy engine for notifications.

BACKGROUND

Modern computer devices may be configured to provide notifications for users. For example, when a user receives an incoming e-mail, a desktop computer may pop up a notification in the notification area. On a tablet or smart phone, a notification may appear on a "pull-down" menu. In many cases, notifications are accompanied by hovering "tool tips," sounds, color changes, motion, or other highly-visible actions.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
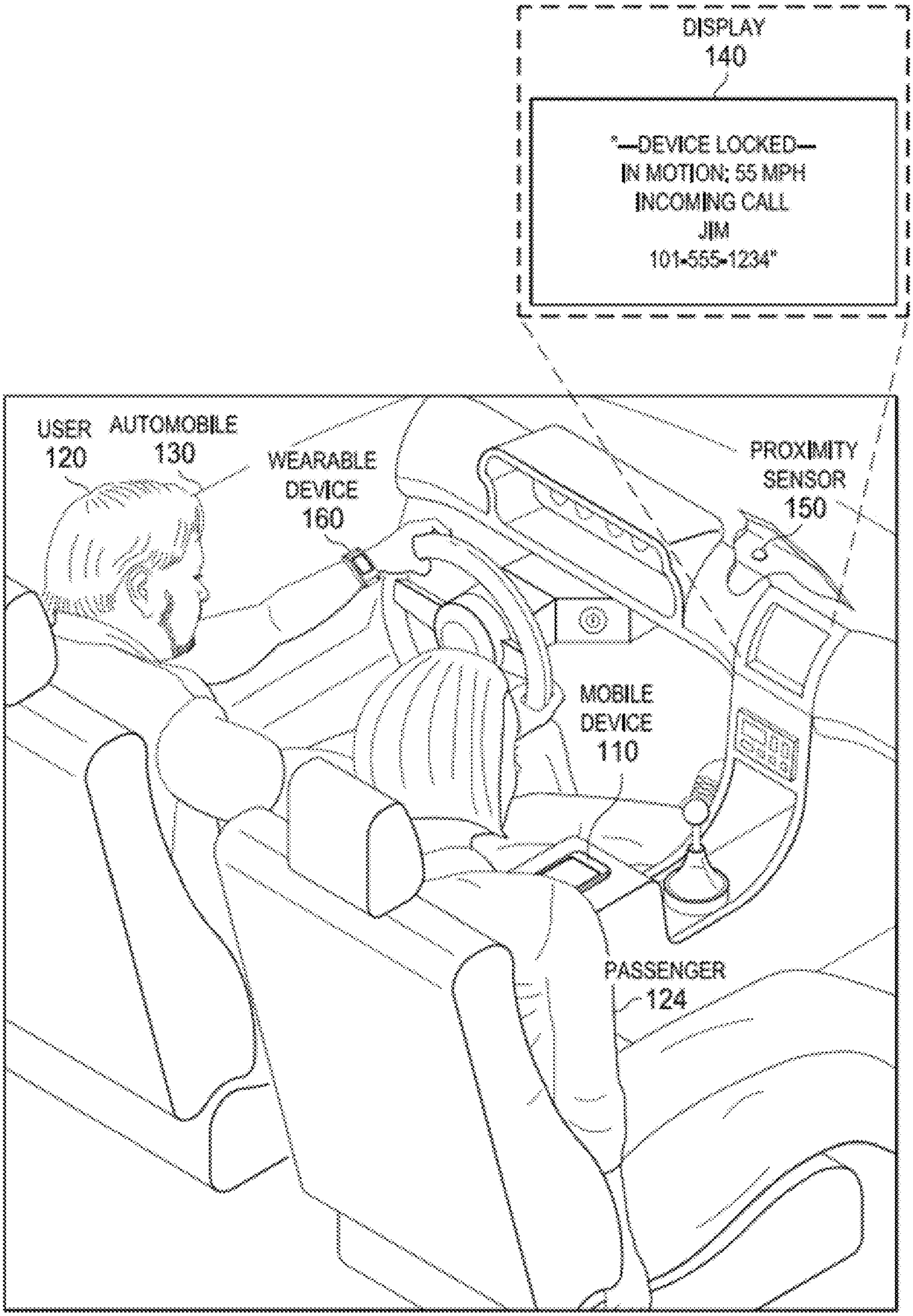
FIG. 1 is a block diagram of an illustration of a user operating a contextual privacy device according to one or more examples of the present specification.

In an example, there is disclosed a computing apparatus, including a user notification interface; a context interface; and one or more logic elements forming a contextual privacy engine operable to: receive a notification; receive a context via the context interface; apply the context to the notification via a notification rule; and take an action via the user notification interface based at least in part on the applying. The contextual privacy engine may also be operable to mathematically incorporate user feedback into the notification rule. There is also described a method of providing a contextual privacy engine, and one or more computer-readable storage mediums having stored thereon executable instructions for providing a contextual privacy engine.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

While useful for immediately informing a user of an incoming message, event, or activity, notifications can also be problematic. Consider the following illustrative and nonlimiting examples:

a. User Tom is projecting his laptop's screen in a conference room during an important business meeting. His wife, unaware of the meeting, sends him a flirty, suggestive e-mail, and a notification pops up with a preview of the message. The message causes embarrassment, and derails the meeting.

b. User Shelly has been contacted by a recruiter about a new job opportunity that is a good fit for her and that comes with a pay raise. She has not, however, decided for certain to accept the job. While her supervisor is in her office in full view of her computer screen, the recruiter sends an e-mail that says, "Good news! They have extended a job offer and would love for you to start ASAP!"

c. User Carl has joined an e-mail list for his "ham" radio hobby. While he loves to exchange messages on the list in his spare time, message notifications are distracting while he is at work.

d. User Natalie is an attorney conferencing with a client via a desktop sharing program. While she is sharing her desktop, her paralegal sends her an e-mail containing confidential information about another client, and her e-mail application pops up a notification icon, along with a floating preview of the message that persists for several seconds. The first client is thus exposed to confidential information about the second client that could constitute a breach of the attorney's confidentiality obligations.

e. User Joe suffers from a serious psychological condition known as "flidgetism," which is sensitive and in some circles carries a social stigma. While Joe is driving in the car with his friends, and his phone is connected via Bluetooth, Dr. Jones calls. The large display screen in Joe's car lights up with "Dr. Jones—Northeast Flidget Institute" in bright letters. To make matters worse, when Joe doesn't answer, Dr. Jones leaves a message that is played over the speakers in Joe's car: "Joe, your blood work came back. Please give me a call so we can discuss your medication dosage."

f. User Hannah has a smart phone with many applications installed, all of which want to provide "push" notifications on a regular basis. While Hannah finds some of these notifications useful, many of them are superfluous or uninteresting. She would like to receive some immediately, regardless of context, others she would like to receive only outside of business hours or when she is not in a meeting, and still others she would like to never have to see at all. However, Hannah does not want to manually configure notifications for every single application and context, and even if she wanted to, she wouldn't know where to start. She would prefer for the phone to "learn" which notifications she finds useful, and when, where, and how she prefers to receive them.

In each of the foregoing examples, there are useful notifications that the user finds beneficial. But in each case, the context of the notification inappropriate.

In Tom's case, the message from his wife is entirely appropriate for his private consumption, but entirely inappropriate for the whole conference room. Tom may not even be concerned about receiving the notification during work hours, but he would prefer to receive it after his meeting is over.

In Shelly's case, the message from the recruiter is extremely useful to her, and she would like to be notified of it as soon as is practical, but sharing the message with her boss can harm her career prospects and compromise her negotiating position.

In Carl's case, he wants to receive notifications of new messages while he is engaging in his amateur radio hobby. But they are distracting during work hours, tending to take his mind off of his work and to where he would prefer to be and what he would prefer to be doing.

In Natalie's case, she needs the confidential information about her second client, and needs to be timely notified that it is available. However, the notification should not be displayed while Natalie is sharing her desktop via a conferencing application, as this may in fact constitute an ethical or professional breach for Natalie. Depending on the nature of the information, and the identity of the two clients, this breach could be anything from a harmless snafu to a multi-million-dollar game-changer.

In Joe's case, the message from his doctor may be extremely important. However, because of the social stigma attached to fidgetism, he does not want to share the information with his friends, and he doesn't want the doctor's message to be played on the speakers in his car. He would prefer that the incoming call be sent straight to his voicemail, and that he receive a notification after he has disconnected from the Bluetooth interface.

In Hannah's case, she simply wants to receive notifications that are of interest to her, at times and in places that they are useful to her, and not be bothered with notifications that are of no use or interest. This may depend not only on the nature of the content, but also Hannah's context, such as where she is, what she is doing, what time of day it is, what activities are scheduled on her calendar, and who is with her.

The present specification provides a system and method for a contextual privacy engine that is configured to detect a user's context and, based on that context, take an action with respect to a notification. In an example, a user's device is provided with a notification interface, which may be used to provide notifications to the user. A context interface may be used to detect context, which may inform notification rules. When the device receives an incoming notification, the contextual privacy engine examines the notification in light of the notification rules and contextual data, and takes an action.

Context may include any of the following, by way of non-limiting example:

a. Location—There are many ways of determining the location of a user or device. For example, a GPS input, or triangulation or proximity to certain access points, may be used to determine a location.

b. Motion and Speed—Motion may be detected, for example, by a GPS or accelerometer. When a user is moving, or moving at greater than a particular speed, it may be desirable to modify notifications. For example, if a user is driving, it is safer to not provide notifications of incoming text messages until the car is stopped.

c. Presence of other people—Some notifications are very private, and should not be shared with other people at all. In those cases, a notification rule may suppress certain notifications while other people are present. Presence of others may be determined, for example, by using a camera or other optical device to identify object in a room as people, or by detecting transmissions from nearby mobile devices.

d. Identity of other people—Some notifications are appropriate to share only with certain specific individuals (whitelist), or with all but a set of specified individuals (blacklist). There are many ways of determining when others are present, and what their identities are. For example, a contextual interface may include a camera or other optical device that may capture images of those present, and may use facial recognition to determine the identity of those people. In another example, a wireless communication device may listen for transmissions from nearby mobile devices, and may compare them for example to a contacts list to try to determine the device owners' identities.

e. Time—This factor can implicate time of day, day of week, time of month, time of year, or any other suitable temporal factor. For example, a user may not wish to receive notifications of certain types of e-mails during work hours, such as 8 am to 5 pm on weekdays. Another user may work a more irregular schedule (for example, a swing shift every third Tuesday of the month). A teacher may have different summer and school year schedules. Many other combinations of temporal factors are possible.

f. Calendar events—Regular temporal schedules may be modified by calendar events. For example, a user may not mind receiving certain notifications while he is at his desk, but may not want to receive them while in a meeting. Conversely, certain notifications that are inappropriate for work may be acceptable when the user is out of office or on vacation.

g. Third-party program operation—Some notifications may be inappropriate while other, third-party programs are running, particularly in the foreground. For example, if the user is operating a desktop sharing program, notifications may be suspended so that they do not appear on the shared desktop. In another example, a user may be playing a computer game, in which case popup notifications may steal focus or otherwise interrupt operation of the game. Many other examples are possible.

h. Third-party program inputs—In some examples, third-party programs may provide specific messages that affect notification rules, either explicitly or implicitly. For example, a game as mentioned above may send a message via an appropriate message bus that requests suspension of notifications. In another example, a contextual privacy engine may listen on a message bus for messages that implicitly affect notifications.

i. Nature of current input method—The current input device may affect notifications. For example, messages may be appropriate while a laptop is docked in a docking station with a full keyboard and mouse, but may be inappropriate while undocked.

j. Nature of current output method—Similarly, output devices may also affect notification. For example, a message may be acceptable while a laptop is docked, but may be unacceptable if the laptop is undocked, particularly if it is connected to a projector. In another example, notifications may be sent only to certain selected output devices. For example, a laptop may be paired to an auxiliary device, such as a wearable computer, smart watch, or smart phone. Notifications that are suppressed on the laptop may, in appropriate circumstances, be displayed on the auxiliary device.

k. Incoming application programming interface (API) data—In some examples, a contextual notification engine may provide an API that allows external devices and programs to provide "plugins," so that they can explicitly send messages or modify notification rules.

l. Outgoing API data—A contextual notification engine may also be configured to act as a plugin to a third-party program. In that case, the availability and functionality of APIs may affect notification rules. For example, the API may allow the notification engine to read the user's calendar.

m. Environmental factors—Many modern devices include environmental sensors, and new devices in the future may be provided with new environmental inputs. Environmental inputs may include temperature, pressure, humidity, acceleration, direction, acidity, alkalinity, and any other sensor input. In some cases, specific environmental transducers are provided to send sensed inputs. Any of these may be appropriately integrated into notification rules. For example, environmental sensors may help to deduce the device's location to provide location-appropriate notifications.

n. Biometric transducers—A special case of environmental transducers includes biometric transducers. In this case, a biometric transducer may indicate, for example, when a user is under stress, or highly task-focused. In those cases, some or all notifications may be inappropriate.

o. Biometric user recognition—Biometric inputs may also be used for authentication. For example, fingerprints, voice prints, and retinal scans may be used to identify users, either alone, or as part of a multi-factor authentication scheme. Some updates may be provided only in the presence of certain biometric user recognition conditions.

p. Authentication strength—In appropriate circumstances, strength of authentication may vary. For example, a user may authenticate via a password only, or via two-factor authentication. A contextual notification engine may take into account the strength of authentication, such as providing certain notifications only when the authentication strength exceeds a particular threshold.

q. Alternative Authentication—A device may provide a "panic mode." If the user is forced to authenticate himself to the device under duress, he may provide alternative authentication (such as an alternate password). Notifications may be suppressed, purged, or otherwise altered to compensate. In this case, outgoing alerts may also be provided, such as notifying appropriate authorities.

r. Presence of security tokens—Security tokens (such as smart cards and RFID tokens by way of nonlimiting example) may form part of a single-factor or multi-factor authentication scheme. They may also be used to determine when a user is nearby.

Advantageously, users need not manually enter every possible context and rule to get the desired behavior. Rather, the user may be able to enter certain baseline rules to manage the most important behavior, and the notification engine may infer other rules based on the user's behavior. For example, if a user quickly or immediately dismisses a notification, it may be inferred that the notification is inappropriate for that context. If the notification sits for a time, and the user then dismisses it without looking at it or acting on it, it may be inferred that the notification is not of interest to the user. If the user immediately acts on a notification, it may be inferred that the notification is desirable and in-context. If the user waits for a time and then acts on the notification, it may be inferred that the notification is desirable but out-of-context, or at least that the original context was sub-optimal.

To optimize decisions about which notifications to show when, the notification engine may use a machine learning engine to mathematically incorporate user feedback. For additional context, decisions of the contextual privacy engine may, in appropriate circumstances, be exported to a server in the "cloud," where data (potentially anonymized) about large classes of decisions may be aggregated to identify trends and common decisions. In turn, the contextual privacy engine may draw information from the cloud to further refine its decisions.

It should also be noted that various actions may be taken in addition to "full notification" or "no notification." By way of nonlimiting example, options may include notify now, notify later, dismiss notification, mute notification, subdue notification, encrypt notification, encode notification, and scramble notification.

A system and method for contextual notification will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a perspective view of a user 120 operating a mobile device 110 while driving an automobile 130. A passenger 124 also rides in automobile 124. In this example, user 120 may be any suitable human actor. In another example, user 120 may not be a human actor, but may instead be a machine actor. For example, user 120 may be a mobile device that interfaces with a server or other computing device appropriately configured to provide the methods of the present specification. In that context, mobile device 110 may be any suitable computing device, including a remote server that provides the functions described herein. In a more generic sense, user 120 may be any person, entity, or thing that operates mobile device 110, which may be any suitable computing device. It is therefore intended that the teachings of this Specification be broadly construed to include any suitable combination of actors, human, machine, or otherwise, that are configured and operable to carry out the methods described herein.

For purposes of discussion, with reference to FIG. 1, user 120 will be described as a human user operating automobile 130, while passenger 124 rides and may also be capable of operating mobile device 110. In this example, mobile device 110 has a suitable data connection to automobile 130, for example a Bluetooth or other wireless connection, or a USB or other wired connection. For purposes of this discussion, a Bluetooth connection will be used as an example.

In this example, automobile 130 includes a display 140 that is highly visible to user 120 and to passenger 124. In one example, display 140 is on a dashboard of automobile 130, and includes a large-font, high-contrast text display that user 120 can observe and read readily without being distracted.

Also in this example, automobile 150 includes a proximity sensor 150 that is configured to detect a location of user 120 and/or mobile passenger 124. Proximity sensor 150 may be configured to provide back to mobile device 110 a signal or other data stream indicating whether user 120 is located in a driver's seat of automobile 130, or in the passenger seat of automobile 130. This may provide additional flexibility for a contextual privacy engine 224 (FIG. 2) of mobile device 110.

A discrete proximity sensor 150 is disclosed by way of example, but other types of active and passive sensors may be used. For example, many vehicles have existing pressure switches in the passenger side and driver side seats to activate or deactivate airbags according to activation criteria. Data from such a sensor could be used as proximity sensor 150. For example, if a pressure switch on the driver's side is activated, and no pressure switch is activated on the passenger side, then contextual privacy engine 224 may infer that user 120 is alone. If automobile 130 has a rear seat, sensors there could also be used to detect passengers.

In another example, user 120 may also have a wearable device 160. Wearable device 160 can be communicatively coupled to mobile device 110 so that contextual privacy engine 224 can select between at least three notification states: notification on mobile device 110 only, notification on wearable device 160 only, or full notification via automobile display 140.

It should be noted, however, that the various applications and embodiments of proximity sensor 150 may be optional. In some cases, a policy may be configured to ensure that mobile device 110 defaults to its most restrictive state regardless of whether proximity sensor 150 is present.

In this example, automobile 130 includes display 140. Display 140 may provide, in addition to contextual notifications, useful context-sensitive data to user 120. For example, in FIG. 1, display 140 indicates that mobile device 110 is currently in a locked state (i.e., direct user input is locked out). This may be, for example, a safety precaution because automobile 130 is currently in motion. Additionally, display 140 informs user 120 that automobile 130 is currently moving at 55 miles per hour. This information may further advantageously be used to assist user 120 in ensuring that he is operating automobile 130 legally, for example, within a posted speed limit. Finally, display 140 may provide notifications, as determined by contextual privacy engine 224. For example, in this case, user 120 can see that he has an incoming call from a friend named Jim whose phone number is 101-555-1234.

The embodiment of FIG. 1 discloses one example of a situation in which a contextual privacy engine 224 is useful. Specifically, user 120 wants to ensure that passenger 124 does not view private, embarrassing, or out-of-context messages. As discussed elsewhere herein, many other contextual privacy situations are possible, and all such appropriate situations are intended to be covered by the broad scope of this disclosure.

Figure 2:
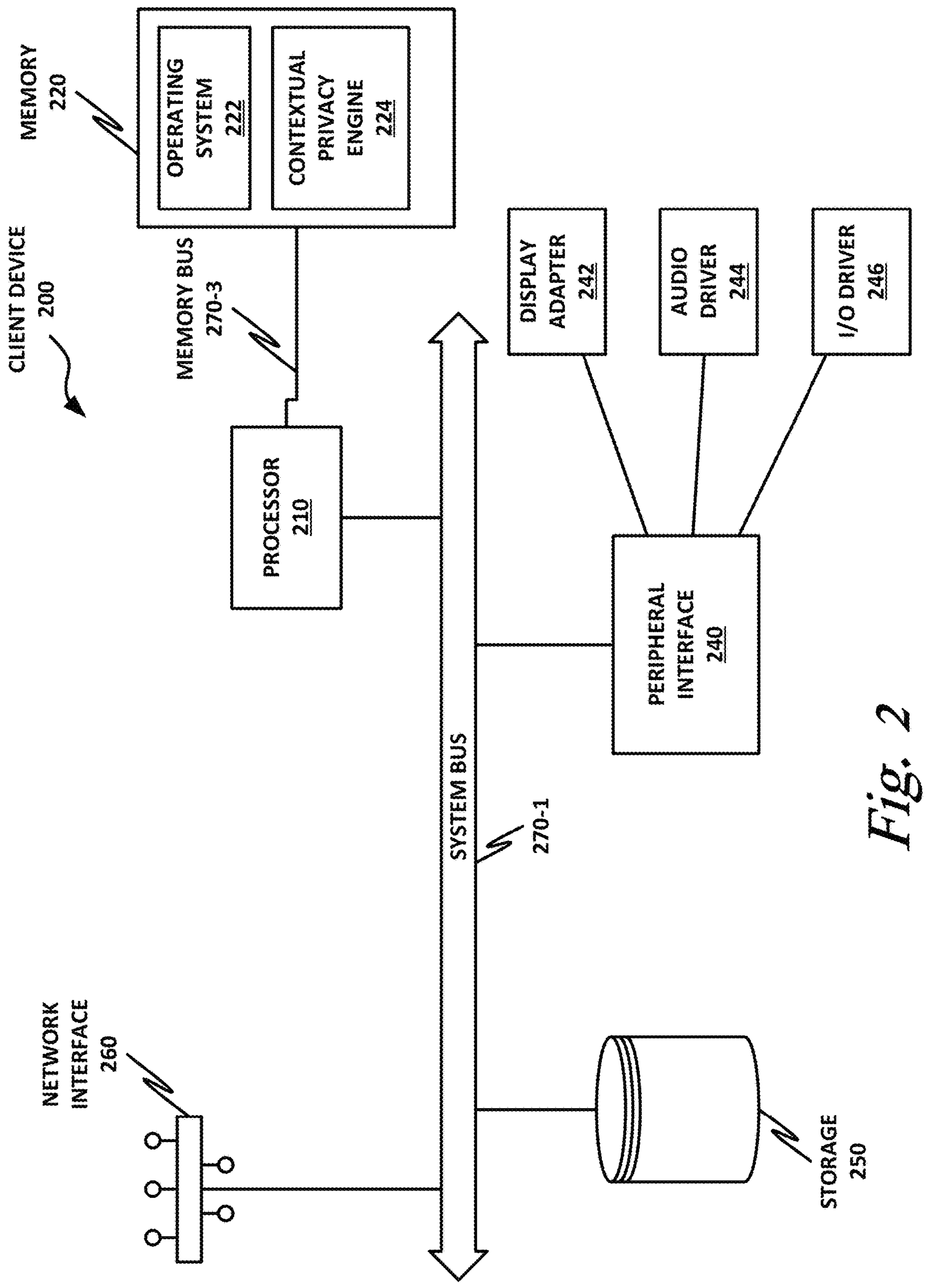
FIG. 2 is a block diagram of a computing device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client device 110 may be an example of computing device 200.

Computing device 200 includes a processor 210 connected to a memory 220, having stored therein executable instructions for providing an operating system 222 and at least software portions of a contextual privacy engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of contextual privacy engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Contextual privacy engine 224, in one example, is operable to carry out computer-implemented methods as described in this specification. Contextual privacy engine 224 may include one or more tangible non-transitory computer-readable mediums having stored thereon executable instructions operable to instruct a processor to provide a contextual privacy engine 224. As used throughout this specification, an "engine" includes any combination of one or more logic elements, of similar or dissimilar species, operable for and configured to perform one or more methods provided by the engine. Thus, contextual privacy engine 224 may comprise one or more logic elements configured to provide methods as disclosed in this specification. In some cases, contextual privacy engine 224 may include a special integrated circuit designed to carry out a method or a part thereof, and may also include software instructions operable to instruct a processor to perform the method. In some cases, contextual privacy engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that contextual privacy engine 224 may also include other hardware and software, including configuration files, registry entries, and interactive or user-mode software by way of non-limiting example.

In one example, contextual privacy engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of contextual privacy engine 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

I/O driver 246 may, in a particular case, be configured to communicatively couple to one or more contextual sensors, which provide inputs to a context engine of contextual privacy engine 224. Display adapter 242 and audio driver 244 may provide visible or audible notifications.

Figure 3:
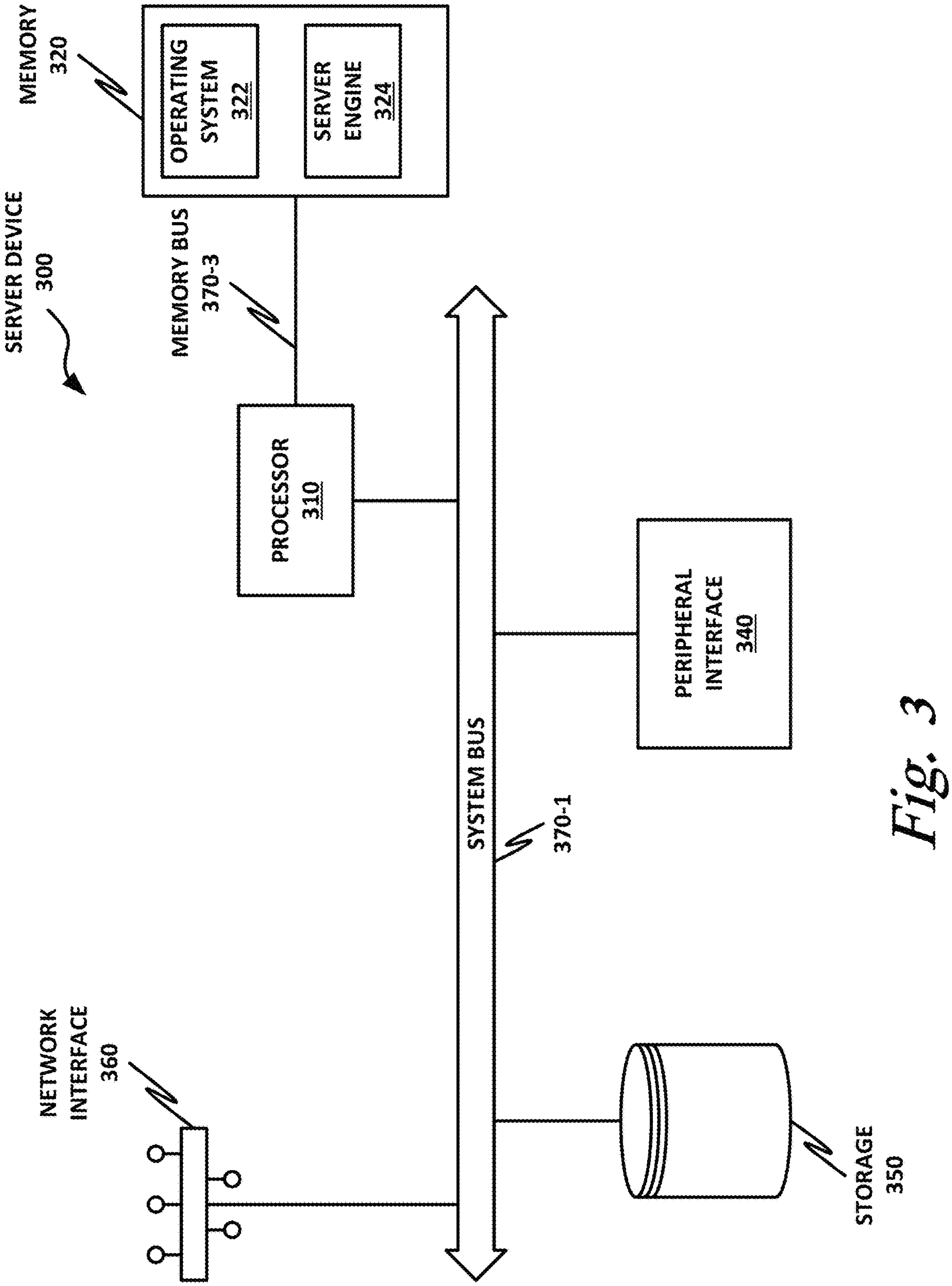
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

In certain embodiments, server 300 may be disposed to act as a "cloud" server, so that one or more contextual privacy engines 224 can upload contextual data. This may enhance the overall effectiveness of contextual decisions by aggregating many decisions across many devices to look for trends and commonalities.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method. This may include providing a cloud storage interface for sending, receiving, aggregating, and analyzing contextual privacy decisions.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
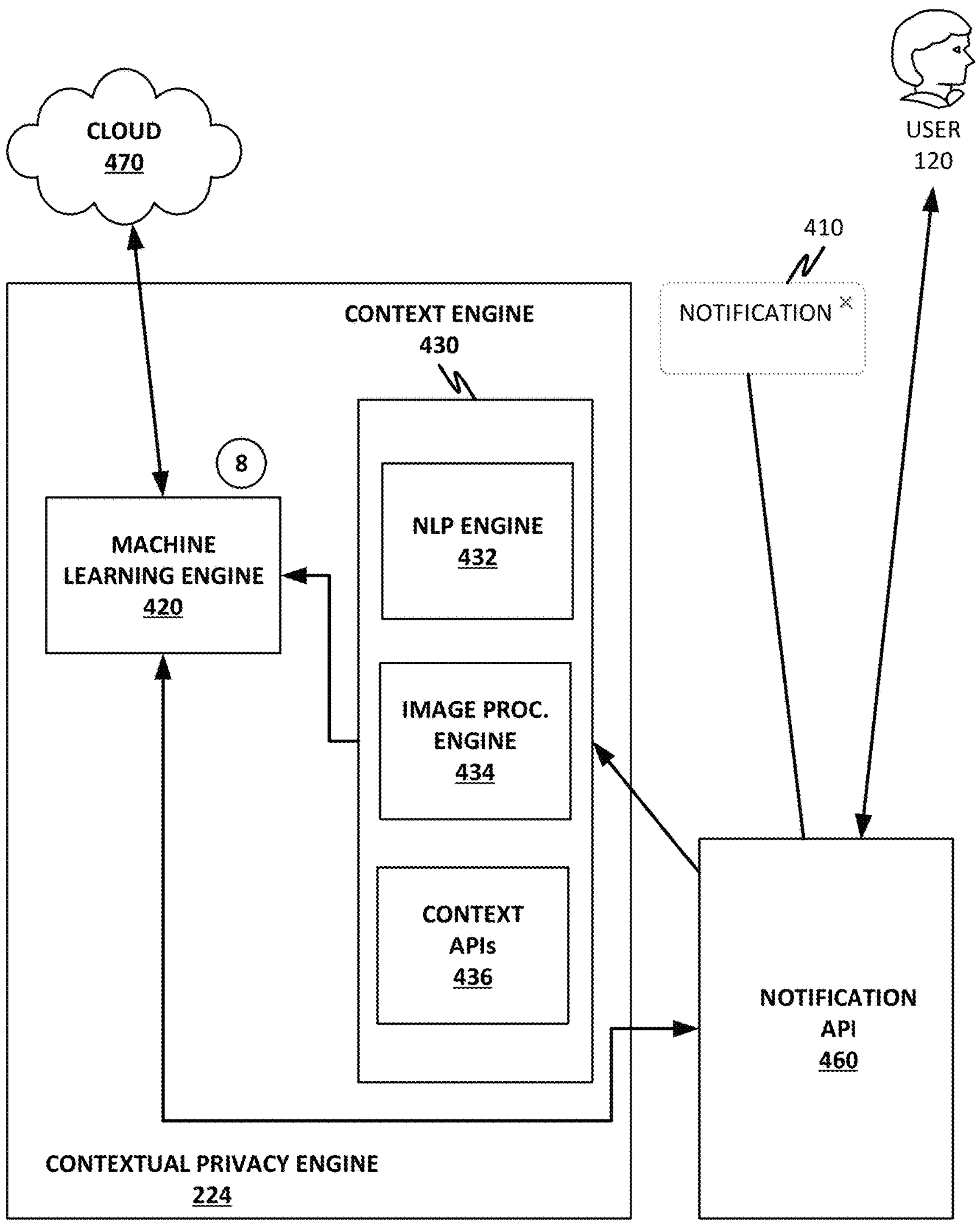
FIG. 4 is a block diagram of a contextual privacy engine according to one or more examples of the present specification.

FIG. 4 is a block diagram of a contextual privacy engine 224 according to one or more examples of the present specification. Contextual privacy engine 224 includes a machine learning engine 420 and a context engine 430. It communicates with a cloud service 470, provided for example by a server 300 (FIG. 3), and with a notification API 460. Notification API 460 receives incoming notifications 410, and provides the notifications in a perceptible form to user 120. Inputs from contextual privacy engine 224 may affect how notification API 460 notifies user 120. User 120 may also provide feedback to contextual privacy engine 224, optionally via notification API 460, which contextual privacy engine 224 may incorporate into machine learning engine 420.

Machine learning engine 420 may be trained on or learn from messages as they come in. For example, on a particular day, user Tom may receive the following messages, which are classified in the following table, in which some details are redacted.

| Notification | Class | Sensitivity | Urgency | Profanity/ Slang/ Sexual Content |
|---|---|---|---|---|
| Your debit card [REDACTED] has been used to make a purchase of $[REDACTED] on 30 Mar. 2015 at CALIFORNIA BURRITO. The balance is now $[REDACTED] | Financial | High | Medium | None |
| OTP for SBI Payment Gateway 3D Secure registration is [REDACTED]. Please DO NOT share with anyone. | Password | High | High | None |
| Melissa: The kids are all at school. If you come home for lunch, [REDACTED]. | Personal | Medium | High | High |
| Bill for your Airtel mobile 222-555-1234, dated 22 Feb. 2015 for $[REDACTED]. Due on 15 Mar. 2015. | Utility/ Bill | Low | High | None |

-continued

| Notification | Class | Sensitivity | Urgency | Profanity/ Slang/ Sexual Content |
|---|---|---|---|---|
| Please pay on time to avoid late fees! | | | | |
| Recruiter: It's an offer, baby! Starting salary is $[REDACTED]! | Pro-fessional | High | Medium | Medium |

Machine learning engine 420 learns and adapts to privacy preferences of user 120 for particular overall contexts. For example, machine learning engine 420 learns what actions user 120 wants an application to take when a message is received in a particular context, and adapts to changing preferences of the user over time.

The context against which privacy preferences are learned is designated a context vector. The context vector is a set of contextual clues that may include location, time-of-day, number-of-people-nearby, message-semantics, and any other context factors disclosed herein. Context data may be received from one or more engines within context engine 430. For example, context engine 430 may include a natural language processing engine 432, an image processing engine 434, and context APIs 434.

NLP engine 432 may be configured to "read" an incoming message, or a proposed notification, and process in a natural manner. This engine may thus be able to infer a notification's intent, scope, or subject matter based on its language. For example, based on discussions of account balances and amounts due, NLP engine 432 may recognize the first message as a financial notification, and the fourth as a bill. Based on the user of the term "OTP" (one-time pad), and the injunction DO NOT SHARE, NLP engine 432 may recognize the second message as a password. Based on intimate language, NLP engine 432 may recognize the third message as a marital communication.

NLP engine 432 may also recognize certain words and phrases that affect context. For example, the user of "baby!" in the last message may mark the message as containing slang, even though the context is otherwise unknown. Thus, contextual privacy engine 224 may deem the message unfit to share in plain form at work. Similarly, the third message, from "Melissa" may contain familiar or explicit language that may not be appropriate for sharing, and thus contextual privacy engine 224 may also suppress that notification.

Image processing engine 434 may be provided, for example, to analyze photographic inputs to determine the nature of who or what is nearby. For example, in the chart above, user Tom may prefer to not receive a notification of a personal message from his wife Melissa if there is anybody else present. This is true whether or not the message includes any "trigger" words or phrases recognized by NLP engine 432. Tom considers text messages between him and Melissa to be their private business, and thus wants those messages to be suppressed while others are present. Alternatively, Tom may provide a special encoded or "dummy" message that lets him know that he has a message from Melissa, but that others will not understand. For example, Tom may train his phone to always output the notification, "Shipping update on your package" when he receives a message from Melissa. This informs Tom that he has a message from his wife, but provides no useful information to anybody else, thus allowing Tom to view the actual message as soon as is convenient for him.

Image processing engine 434 may also provide more advanced image processing. For example, Tom may wish to ensure that the message from the recruiter is never displayed when his boss is present. Thus, image processing engine 434 may include facial recognition features to identify when Tom's boss is in the room.

Context APIs 436 may include APIs that are either incoming from or outgoing to third-party applications. For example, context engine 430 may access user Tom's address book, and find that "Melissa" is listed as Tom's wife. Thus, even if NLP engine 432 is not able to adequately parse the third message, the mere fact that the message is from Melissa (or any other family member) may allow contextual privacy engine 224 to infer that the message is of a private nature and should not be shared out of context. Similarly, if NLP engine 432 fails to recognize the last message as a message from a recruiter, the address book may provide the recruiter's identity, thus providing substantial context for the message.

A context vector may be or include a data structure, for example:

```
{
    {From: <sender-name>},
    {
        {Classified-topic: <class>},
        {Sensitivity: <High, Medium, Low>},
        {Urgency: <High, Medium, Low>},
        {Profanity: <High, Medium, Low, None}
    },
    {Number-of-people-in-vicinity: <count>},
    {Location: <location_name>}
}
```

In one example, machine learning engine 420 stores knowledge in a knowledge database (KDB) in the form of rules. A rule may be represented by a triplet <cxt, ac, cs>, where cxt is a set of contexts, ac is an action, and cs is a confidence-score. A rule can be either active or inactive (default).

When context engine 430 identifies an incoming message, it may perform the following operations by way of example:

a. Build a context-vector (using one or more appropriate context engines).
b. Query machine learning engine 420 to see if there is an active rule that corresponds to this context vector. This may include a match in one or more fields, and the rule may also contain an action.
c. If the rule exists, check the confidence score to see if it is sufficiently high to automatically enforce the rule.
d. If an active and enforceable rule exists, perform the action contained in the rule.
e. If no active and enforceable rule exists, solicit feedback from the user on what action the user would like to take. This may include any of the actions discussed herein.
f. If user feedback is received, machine learning engine 420 updates the confidence-score for actions for the given context. This may include the formula below.
g. As more feedback accumulates over time, the confidence score for an action may exceed an activation-threshold value. Then the context-action-confidence triplet becomes an active and enforceable rule.
h. 5. To account for change in user preferences, contextual privacy engine 224 may provide a "timeout" (based on one or both of time and number of occurrences, for example). After the timeout, contextual privacy engine 224 may again solicit user feedback to confirm that the rule ought to remain active and enforceable. This helps contextual privacy engine 224 to identify the most useful rules based on user feedback. As the number of confirmations grows, the timeout may increase, thus pestering the user for feedback less frequently as the confidence increases.

i. When feedback is solicited, if the user changes the action $A_m$ from the current learned action ($A_n$, n≠m), then the confidence measure for $A_n$ is lowered and that of $A_m$ is increased. This may result in an active rule getting deactivated and an inactive rule getting activated.

Each action may be enumerated (e.g., {Notify, No-Notify, Partial-Notify, Encode, Scramble}). Machine learning engine 420 may then keep a confidence-score for each action relative to any context. This score denotes the confidence measure that the engine has for an action to be taken given some context. When the engine encounters a new context (context-vector), it automatically creates new rules for the context, paired with each possible action, adding them as records in the KDB. A newly created rule is inactive with a default confidence score value.

For a context with no active rule (e.g., where there is no "preferred" action with a high enough confidence level), machine learning engine 420 may solicit feedback from user 120 on what action to take. This action is then provided to machine learning engine 420, which can both cause the action to be taken, and increase the score for that action.

The confidence score of an action given as feedback by user 120 may be updated, in one example, according to the following formula:

$$score_{new}(A_i)=\min(score_{old}(A_i)+f1*f2*\Delta+c, 1+t)$$

Where:

a. A is the set of all actions that may be taken (including any action described herein).

b. i is the index of the action chosen by the user (i.e., the actions are provided in an ordered array or data structure such as "enum," and i is the index).

c. t is a threshold value for rule activation. Rules with a score below t are inactive, while rules with a score above t are active.

d. f1 is a percentage of "true" or "affirmative" feedback given by the user (0<f1<1).

e. f2 is a percentage of active rules in the KDB that have $A_i$ as the preferred action (0<f2<1).

f. Δ is the difference between t and $score_{old}(A_i)$.

g. c is a constant value that determines the rate of growth of confidence score (c>0).

A: Set of all actions application can take {R, DR, RL} i: The index of the action given by the user as feedback t: The threshold value for rule-activation (t>O)

When the confidence score cs for an action $A_i$ for a particular context $cv_j$ exceeds the threshold value t, then the rule $r_{ji}$ represented by the triplet $<cv_j,cs,A_i>$ gets activated. If machine learning engine 420 is then queried with a context equivalent to $cv_j$ (i.e., matching completely, or matching sufficiently closely, as defined in a particular implementation), then rule $r_{ji}$ is applied and the action A is performed by the client application.

As will be appreciated from this formula, on every update, machine learning engine 420 may increment the confidence score of an action by an amount that lowers the gap between the current confidence score and the threshold value of activation t.

The foregoing method provides many advantages. For example, simply adding Δ along with a constant C to $score_{old}$ (i.e., f1=f2=1,c>0), results in $score_{new}$ could exceed t after one event. This means that the rule gets activated after a single feedback, implying that machine learning engine 420 gives full confidence to any isolated feedback that the user give, regardless of past interaction history. This is both counterintuitive and inefficient. In contrast, the factors f1 and f2 enable changes to be effected more gradually as actions are repeated.

Factor f1 is the percentage (or normalized fraction) of "true" feedback that user 120 gives. This can track the number of times a user gives true feedback before a rule becomes active. If user 120 gives many false-negatives, then f1 will be low, and on each update the increment in confidence-score will be lower as compare to another user with fewer false-negatives.

For feedback of an action $A_i$ factor f2 denotes the percentage of active rules in KDB with $A_i$ as the preferred action. If there are many active rules in the KDB with $A_i$ as the preferred action, then on each update the increment in confidence-score will be higher as compared to feedback for another action $A_j$ where $count(A_i)>count(A_j)$.

To account for changing privacy preferences of a user, a learned rule may not be maintained in perpetuity. Rather, the rule may be "refreshed" periodically to ensure that it still reflects a valid user preference. Thus, machine learning engine 420 may periodically prompt user 120 to confirm that a learned rule is still useful. The time between prompts may be proportional to the confidence score for the rule. The more confidence there is attached to the rule, the longer the time between prompts.

When machine learning engine 420 prompts user 120 to confirm an active rule $r_{ji}(cv_j,A_i)$, user 120 may either affirm or deny. In an example, in the case of an affirmative response, the prompt-time for $r_{ji}$ is doubled, until it reaches a maximum value. If the user denies, and instead opts for alternative action $A_k$,(i≠k), then the confidence score for $A_i$ may be set to its default value (i.e., initial condition), while the confidence of $A_k$ may be increased according to the above equation.

Figure 5:
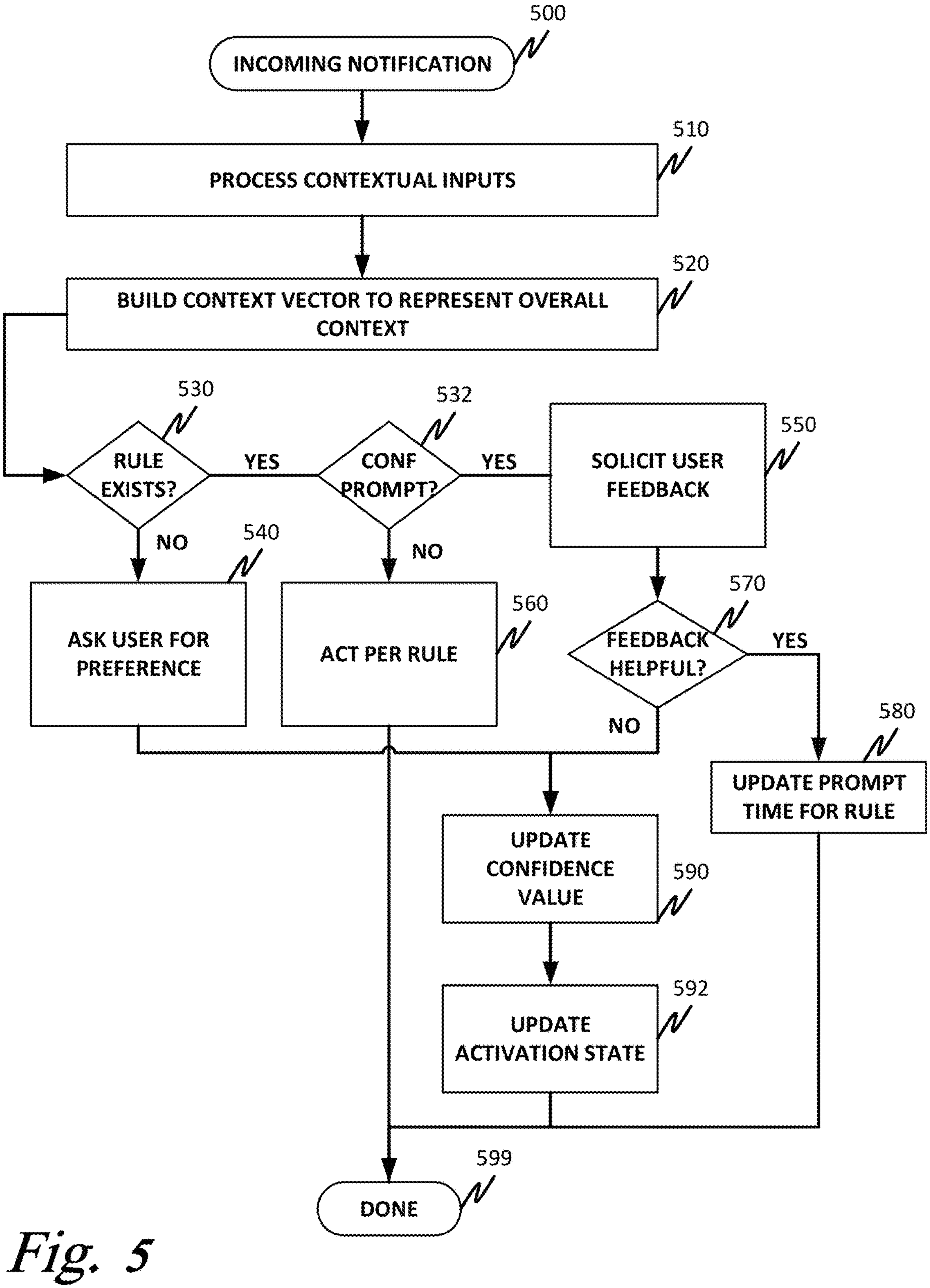
FIG. 5 is a flow chart of a method performed by a contextual privacy engine according to one or more examples of the present specification.

FIG. 5 is a flow chart of a method performed by contextual privacy engine 224 according to one or more examples of the present specification.

In block 500, contextual privacy engine 224 receives an incoming notification.

In block 510, context engine 430 processes contextual inputs. This may include, for example, NLP engine 432, image processing engine 434, and contextual APIs 436. This may also include any other contextual engines or methods disclosed herein.

In block 520, machine learning engine 420 builds a context vector to represent the overall context. The context vector may be built according to the methods described previously.

Once the context vector is been built, then in decision block 530, machine learning engine 420 checks its knowledge base to determine whether an active role exists for this context.

In block 540, if a rule does not exist, then machine learning engine 420 may query user 120 for a preferred action.

Returning to block 530, if a rule does exists, then in decision block 532, machine learning engine 420 checks to see whether it is time to prompt the user for a rule confirmation.

If it is not time to prompt the user, then in block 560, machine learning engine 420 acts according to the rule, and in block 599 the method is done.

Returning decision block 532, if it is time to prompt for confirmation, then in block 550, machine learning engine 420 solicits feedback from user 120.

In decision block 570, machine learning engine 420 determines whether the feedback from user 120 is helpful or beneficial to the rule.

In block 580, if the feedback is useful, then machine learning engine 420 may update the prompt time for the rule, such as expanding the time to the next prompt as described earlier.

Block 590 may be reached either from block 540, or from the "No" branch of block 570. In block 590, machine learning engine 420 updates a confidence value in accordance with whatever the previous action was.

In block 592, machine learning engine 420 checks to see whether the confidence value for the rule has moved above or below the threshold t. If it has, then machine learning engine 420 may update the activation state of that rule (i.e., either making it active or inactive).

In block 599, the method is done.

Figure 6:
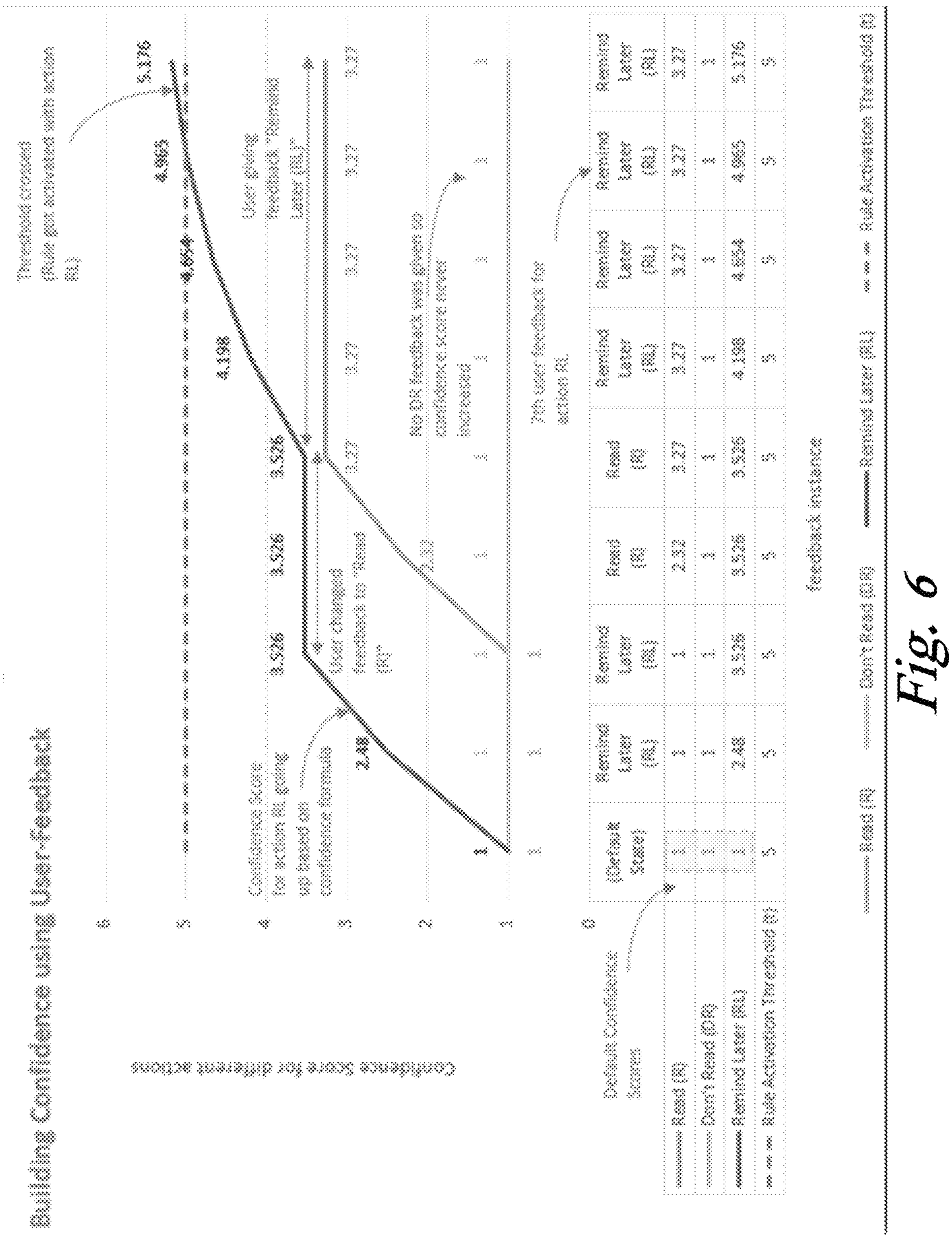
FIG. 6 is a graph of a confidence score according to one or more examples of the present specification.

FIG. 6 is a plot of confidence according to one or more examples of the present specification. Specifically, FIG. 6 compares a linear confidence score to a confidence score computed according to the methods disclosed herein. As can be seen from this graph, with a linear confidence score and an activation threshold eight, seven user feedback events (after the initial encounter that establishes the value at 1.00) are required to cross over the threshold.

In contrast, using the method of the present specification, the rule crosses the threshold after only five steps. Rather than progressing linearly from 1 to 2 to 3 and so on, the rule starts at a baseline of 1.000, leaps immediately to 3.690 after the first affirmative input from the user, makes a slightly smaller moved to 5.519 after the second input, makes a yet smaller change to 6.763 after the third input, and moves to 7.609 after the fourth input. These four inputs take the confidence score nearly to the 8.00 threshold. Finally, on the fifth input, the line crosses the threshold to a value of 8.184. The confidence may then remain stable at 8.184 as the rule is executed normally. If additional confirmation inputs are received, the confidence value may not be adjusted itself, but the time between asking for confirmations may be increased. For purposes of this computation, the values f1=0.8, f2=0.4, c=0.45, and t=8 were used.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (poast-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example, a computing apparatus, comprising: a user notification interface; a context interface; and one or more logic elements comprising a contextual privacy engine operable to: receive a notification; receive a context via the context interface; apply the context to the notification via a notification rule; and take an action via the user notification interface based at least in part on the applying.

There is further disclosed an example, further comprising a feedback interface, wherein the contextual privacy engine is further operable to: receive a feedback via the user feedback interface; and update a confidence score for the notification rule ($score_{old}$) to a new confidence score ($score_{new}$) based at least in part on the feedback content.

There is further disclosed an example, wherein updating the confidence score comprises an operation of the form $score_{new}(A_i)=\min(score_{old}(A_i)+f1*f2*\Delta+c,1+t)$, wherein A represents a set of a plurality of possible actions, i represents an index of the action, t represents a threshold value, f1 represents a fraction of "true" feedback received, f2 represents a percentage of active rules with $A_i$ as the preferred action, $\Delta$ represents a difference between t and $score_{old}(A_i)$, and c is a rate-of-growth constant.

There is further disclosed an example, wherein the action is selected from the group consisting of notify now, notify later, dismiss notification, mute notification, subdue notification, encrypt notification, encode notification, and scramble notification.

There is further disclosed an example, wherein the context comprises an input selected from the group consisting of location, motion, speed, other users present, other users' identities, time, calendar events, third-party program operation, third-party program inputs, input method, incoming application programming interface (API) data, outgoing API data, environmental factors, biometric data, user recognition, authentication strength, alternative authentication, and security tokens.

There is further disclosed an example, wherein applying the context to the notification via a notification rule comprises examining message semantics.

There is further disclosed an example, wherein the contextual privacy engine comprises a natural language processing engine operable to perform semantic analysis of message content.

There is further disclosed an example, wherein message semantics comprise at least a message subject matter type.

There is further disclosed an example, wherein the contextual privacy engine comprises an image processing engine operable to receive an optical input and perform object recognition on the optical input.

There is further disclosed an example, wherein the contextual privacy engine comprises an application programming interface (API) operable to receive third-party program data.

There is further disclosed an example, wherein the API is a native operating system API.

There is further disclosed an example, wherein the contextual privacy engine is operable to build a context vector configured to represent an overall current context.

There is further disclosed an example, wherein the overall current context includes both contextual data and message semantics.

There is further disclosed an example of one or more tangible, non-transitory computer-readable storage mediums having stored thereon executable instructions for instructing one or more processors for providing a contextual privacy engine operable for performing any or all of the operations of the preceding examples.

There is further disclosed an example of a method of providing a contextual privacy engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:

a hardware platform comprising at least a processor, a memory, and a user notification interface;

a context interface;

a feedback interface; and one or more logic elements configured to provide a contextual privacy engine on the hardware platform, the contextual privacy engine configured to:

receive a notification;

receive a context via the context interface;

apply the context to the notification via a notification rule;

receive a feedback via the feedback interface;

receive an existing confidence score for the notification rule ($score_{old}$);

update the existing confidence score to a new confidence score ($score_{new}$) based at least in part on the feedback, wherein updating the confidence score comprises an operation of the form $score_{new}(A_i)=\min(score_{old}(A_i)+f1*f2*\Delta+c,1+t)$, wherein A represents a set of a plurality of possible actions, i represents an index of the action, t represents a threshold value, f1 represents a fraction of "true" feedback received, f2 represents a percentage of active rules with $A_i$, as the preferred action, Δ represents a difference between t and $score_{old}(A_i)$, and c is a rate-of-growth constant, wherein each of the inputs of the new confidence score is stored in a memory or received as an input; and take an action via the user notification interface based at least in part on the new confidence score ($score_{new}$).

2. The computing apparatus of claim 1, wherein the action is selected from the group consisting of notify now, notify later, dismiss notification, mute notification, subdue notification, encrypt notification, encode notification, and scramble notification.

3. The computing apparatus of claim 1, wherein the context comprises an input selected from the group consisting of location, motion, speed, other users present, other users' identities, time, calendar events, third-party program operation, third-party program inputs, input method, incoming application programming interface (API) data, outgoing API data, environmental factors, biometric data, user recognition, authentication strength, alternative authentication, and security tokens.

4. The computing apparatus of claim 1, wherein applying the context to the notification via the notification rule comprises examining message semantics.

5. The computing apparatus of claim 4, wherein message semantics comprise at least a message subject matter type.

6. The computing apparatus of claim 1, wherein the contextual privacy engine comprises a natural language processing engine configured to perform semantic analysis of message content.

7. The computing apparatus of claim 1, wherein the contextual privacy engine comprises an image processing engine configured to receive an optical input and perform object recognition on the optical input.

8. The computing apparatus of claim 1, wherein the contextual privacy engine comprises an application programming interface (API) configured to receive third-party program data.

9. The computing apparatus of claim 8, wherein the API is a native operating system API.

10. The computing apparatus of claim 1, wherein the contextual privacy engine is configured to build a context vector configured to represent an overall current context.

11. The computing apparatus of claim 10, wherein the overall current context includes both contextual data and message semantics.

12. One or more tangible, non-transitory computer-readable storage mediums having stored thereon executable instructions for providing a contextual privacy engine, the contextual privacy engine configured to:

receive a notification;

receive a context;

apply the context to the notification via a notification rule;

receive a feedback;

receive an existing confidence score for the notification rule ($score_{old}$);

update the existing confidence score to a new confidence score ($score_{new}$) based at least in part on the feedback, wherein updating the confidence score comprises an operation of the form $score_{new}(A_i)=\min(score_{old}(A_i)+f1*f2*\Delta+c, 1+t)$, wherein A represents a set of a plurality of possible actions, i represents an index of the action, t represents a threshold value, f1 represents a fraction of "true" feedback received, f2 represents a percentage of active rules with $A_i$ as the preferred action, Δ represents a difference between t and $score_{old}(A_i)$, and c is a rate-of-growth constant, wherein each of the inputs of the new confidence score is stored in a memory or received as an input; and take an action via a user notification interface based at least in part on the new confidence score ($score_{new}$).

13. The one or more tangible, non-transitory computer-readable storage mediums of claim 12, wherein the action is selected from the group consisting of notify now, notify later, dismiss notification, mute notification, subdue notification, encrypt notification, encode notification, and scramble notification.

14. The one or more tangible, non-transitory computer-readable storage mediums of claim 12, wherein the context comprises an input selected from the group consisting of location, motion, speed, other users present, other users' identities, time, calendar events, third-party program operation, third-party program inputs, input method, incoming application programming interface (API) data, outgoing API data, environmental factors, biometric data, user recognition, authentication strength, alternative authentication, and security tokens.

15. The one or more tangible, non-transitory computer-readable storage mediums of claim 12, wherein applying the context to the notification via the notification rule comprises examining message semantics.

16. The one or more tangible, non-transitory computer-readable storage mediums of claim 12, wherein the contextual privacy engine comprises a natural language processing engine configured to perform semantic analysis of message content.

17. The one or more tangible, non-transitory computer-readable storage mediums of claim 12, wherein the contextual privacy engine comprises an image processing engine configured to receive an optical input and perform object recognition on the optical input.

18. The one or more tangible, non-transitory computer-readable storage mediums of claim 12, wherein the contextual privacy engine comprises an application programming interface (API) configured to receive third-party program data.

19. The one or more tangible, non-transitory computer-readable storage mediums of claim 12, wherein the contextual privacy engine is configured to build a context vector configured to represent an overall current context.

20. A computer-implemented method of providing a contextual privacy engine, comprising:

receiving a notification;

receiving a context;

applying the context to the notification via a notification rule;

receiving a feedback;

receiving an existing confidence score for the notification rule ($score_{old}$);

updating the existing confidence score to a new confidence score ($score_{new}$) based at least in part on the feedback, wherein updating the confidence score comprises an operation of the form $score_{new}(A_i)=\min(score_{old}(A_i)+f1*f2*\Delta+c,1+t)$, wherein A represents a set of a plurality of possible actions, i represents an index of the action, t represents a threshold value, f1 represents a fraction of "true" feedback received, f2 represents a percentage of active rules with $A_i$ as the preferred action, Δ represents a difference between t and $score_{old}(A_i)$, and c is a rate-of-growth constant, wherein the inputs of the new confidence score are retrieved from a memory or received as an input; and taking an action via a user notification interface based at least in part on the new confidence score ($score_{new}$).

21. The computer-implemented method of claim 20, wherein the action is selected from the group consisting of notify now, notify later, dismiss notification, mute notification, subdue notification, encrypt notification, encode notification, and scramble notification.

22. The computer-implemented method of claim 20, wherein the context comprises an input selected from the group consisting of location, motion, speed, other users present, other users' identities, time, calendar events, third-party program operation, third-party program inputs, input method, incoming application programming interface (API) data, outgoing API data, environmental factors, biometric data, user recognition, authentication strength, alternative authentication, and security tokens.

23. The computer-implemented method of claim 20, wherein applying the context to the notification via the notification rule comprises examining message semantics.

24. The computer-implemented method of claim 23, wherein message semantics comprise at least a message subject matter type.

25. The computer-implemented method of claim 20, wherein the contextual privacy engine comprises an image processing engine configured to receive an optical input and perform object recognition on the optical input.

* * * * *

UNITED STATES PATENT AND TRADEMARK OFFICE

CERTIFICATE OF CORRECTION

PATENT NO. : 10,530,720 B2
APPLICATION NO. : 14/836993
DATED : January 7, 2020
INVENTOR(S) : Raj Vardhan et al.

It is certified that error appears in the above-identified patent and that said Letters Patent is hereby corrected as shown below:

In the Claims

In Column 21, Lines 35, in Claim 1, delete "Ai," and insert -- Ai --, therefor.

Signed and Sealed this
Twenty-fifth Day of February, 2020

Andrei Iancu
*Director of the United States Patent and Trademark Office*